Patented July 11, 1944

2,353,292

UNITED STATES PATENT OFFICE 2,353,292

PURIFICATION OF PHENOTHIAZINE

Edgar C. Britton and Joseph E. Eisenman, Midland, Mich., assignors to The Dow Chemical Company, Midland, Mich., a corporation of Michigan No Drawing. Application April 10, 1941, Serial No. 387,860

14 Claims. (Cl. 260—243)

This invention concerns a method of purifying phenothiazine.

Phenothiazine is reported in the literature as a crystalline yellow compound melting at 180° C. which turns green under exposure to light and air. However, the compound as obtained by the usual methods for its preparation, e. g. by the reaction of sulphur or sulphur chloride with diphenylamine, and as heretofore available on the market is usually of green to black color, of lower melting point and frequently possesses a foul odor. It is of particularly poor quality when a halogen-containing catalyst such as aluminum chloride, aluminum bromide, chlorine, bromine, or iodine, etc., has been used in the reaction for its preparation.

The kinds of impurities in the usual product are not definitely known, but they probably include oxygen-, sulphur-, and/or halogen-derivatives of the phenothiazine, as well as excess sulphur and catalyst when used. Our attempts to purify the phenothiazine by ordinary purification procedures, e. g. distillation or recrystallization from solvents, have been unsatisfactory. For instance, the product remained badly discolored and retained its foul odor after distillation under vacuum.

Since one of the important uses for phenothiazine is as a medicinal, i. e. an anthelmintic for the internal treatment of animals, there is urgent need for a simple and economical method whereby the compound may satisfactorily be purified. An object of this invention is to provide such a method.

We have discovered that the colored impurities incident to the manufacture of phenothiazine, and in many instances other impurities present, may be removed by treating the impure compound with a basic inorganic compound of one of the metals lithium, sodium, potassium, copper, calcium, strontium, barium, magnesium, zinc, cadmium, and aluminum, and distilling phenothiazine from the resultant mixture. The expression "basic compound" is intended to include not only the metal oxides and hydroxides, but also other compounds of the metals, e. g. carbonates, bicarbonates, sulphides, etc., which when dissolved in water yield alkaline solutions.

In many instances such treatment of crude phenothiazine with the metal compound followed by distillation not only removes all or most of the discoloration, but also frees the compound of other impurities. However, the treated phenothiazine sometimes is of objectionable odor and possesses a greenish tint or rapidly turns green when exposed to light and air. We have further found that the impurities accountable for the odor or for rapid discoloration of the product may be removed by washing the distilled phenothiazine with an organic liquid in which phenothiazine itself is substantially insoluble. For purpose of this invention phenothiazine is considered to be "substantially insoluble" in organic liquids which, at the temperature of the washing operation, dissolve not more than 10 per cent by weight of phenothiazine.

We have still further found that phenothiazine having the melting point of 180° C. which is given in the literature is not entirely pure. By the present method, phenothiazine may be purified to a point at which it is of light cream color, is substantially odorless or possesses only a mild aromatic odor, and melts at 186°–186.5° C. Analysis and other tests indicate this product to be of a purity higher than 99.7 per cent. Such highly purified phenothiazine is exceptionally resistant to discoloration by light and air, e. g. samples thereof have remained free of discoloration after approximately three months of storage in glass bottles under exposure to air and daylight. However, such complete purification is not required. Phenothiazine purified to a point at which it is of cream to yellow or orange-yellow color, possesses a melting point of 180° C. or higher, is substantially free of foul odors, and does not become noticeably discolored upon standing under exposure to air and daylight for one day is of good quality and is satisfactory for most purposes.

In purifying phenothiazine by the present method, the impure discolored compound is treated with one or more of the basic inorganic metal compounds hereinbefore mentioned, preferably in powdered form. Examples of such compounds are the oxides, hydroxides, carbonates, and bicarbonates of each of the metals lithium, sodium, potassium, copper, calcium, strontium, barium, magnesium, zinc, cadmium, and aluminum, and other salts of such metals and weak acids, e. g. the sulphides and thiosulphates of sodium and potassium, etc. The metal compound is usually employed in only small proportion, e. g. in amount corresponding to from 0.2 to 10 per cent and preferably between 0.5 and 5 per cent of the weight of the phenothiazine, but it may be used in larger proportions if desired.

The crude phenothiazine is heated to fusion in a closed vessel prior to or after admixture with the metal compound and the mixture is preferably, though not necessarily, stirred or otherwise agitated to obtain good distribution of the metal compound throughout the mass. Heating of the mixture may advantageously be carried out under vacuum or in contact with an inert atmosphere so as to exclude air and avoid possible loss of phenothiazine through oxidation. The temperature required to melt the crude phenothiazine varies depending upon the impurities present, but is usually between 150° and 180° C. It usually is advisable to heat the mixture for at least a short time, e. g. from 5 to 30 minutes, before recovering the phenothiazine therefrom, but this is not always necessary. When a strong alkali such as sodium or potassium hydroxide is used in the treatment, it reacts rapidly with impurities in the crude material, and the separation of purified phenothiazine from the mixture may be started within a few moments after adding the hydroxide.

After treatment with the metal compound, the phenothiazine is distilled under vacuum, e. g. usually at an absolute pressure below 50 millimeters and preferably below 30 millimeters of mercury. The distilled phenothiazine is usually of cream to yellow or orange-yellow color and of melting point above 180° C. Often it is almost completely pure, particularly when the diphenylamine used as a reactant in forming the phenothiazine was of good purity. However, it sometimes retains an objectionable odor, or has a greenish tint, or rapidly turns green when exposed to light and air.

When necessary, the impurities accountable for the odor and the discoloration may be removed by pulverizing the product and washing it with an organic liquid in which phenothiazine itself is, at the temperature of washing, substantially insoluble. The washing is usually done at room temperature or thereabout, but it may of course be carried out at lower or higher temperatures.

Any of a wide variety of organic liquids may be used to wash the phenothiazine. Examples of such liquids are hydrocarbons such as benzene, toluene, gasoline, ligroin and other petroleum fractions; halohydrocarbons such as carbon tetrachloride, chloroform, methylene bromide, ethylene chloride, propylene chloride, and chlorobenzene; alcohols such as methyl, ethyl, propyl, isopropyl, butyl, and amyl alcohols; and organic acids such as acetic and propionic acids; etc. Although the washing operation is fairly effective in completing the purification, regardless of the particular organic liquid or mixture of organic liquids employed, the liquid halo-aliphatic hydrocarbons, especially carbon tetrachloride, are particularly effective in removing the odoriferous impurities and the alcohols are highly effective in removing the impurities which cause rapid discoloration of the phenothiazine under the action of light and air. Usually the distilled phenothiazine is washed with an equal weight or more of carbon tetrachloride and also of methyl or ethyl alcohol, which organic liquids may be applied consecutively or in admixture with one another as desired. Residual organic liquid is then evaporated from the phenothiazine, whereby the latter is obtained in purified form. The purified product is usually substantially odorless, has a melting point between 180° and 186.5° C. and is of cream to yellow or orange-yellow color.

The following examples describe certain ways in which the principle of the invention has been applied, but are not to be construed as limiting the invention.

EXAMPLE 1

The results obtained in a series of experiments on the purification of phenothiazine are described in the table below. The phenothiazine used as the starting material in each experiment was the product obtained by the catalytic reaction of sulphur with diphenylamine. The samples of such starting material varied in color from green to nearly black and melted at 172°–175° C. or thereabout. In each experiment the crude phenothiazine was treated with a powder of the inorganic metal compound named in the table in the per cent by weight also given. The mixture was heated under vacuum, i. e. at about 25 millimeters absolute pressure, sufficiently to melt the phenothiazine and distill it from the mixture. No attempt was made to fractionate the product during distillation. The table gives the color and the melting point of the distilled product. For purpose of comparison the table includes a run wherein phenothiazine was distilled directly without treatment with a metal compound.

Table

| Run No. | Metal compound | | Distilled product | |
|---|---|---|---|---|
| | Kind | Per cent | Color | M. P., °C. |
| 1 | None | 0 | Brown | 178–181 |
| 2 | NaOH | 0.5 | Orange-yellow | 182–185 |
| 3 | do | 1.0 | Yellow | 182–185 |
| 4 | do | 2.0 | do | 185.5–186.5 |
| 5 | do | 5.0 | Cream | 182–185 |
| 6 | Na₂CO₃ | 2.0 | Orange-yellow | 182–184 |
| 7 | Ca(OH)₂ | 2.0 | do | 180–183 |
| 8 | KOH | 2.0 | Cream | 182–185 |
| 9 | Mg(OH)₂ | 4.0 | Yellow | 182–184 |
| 10 | Ba(OH)₂ | 4.0 | Cream-yellow | 183–185 |
| 11 | Na₂S | 4.0 | do | 182–186 |
| 12 | Na₂SiO₃ | 10.0 | do | 183–185 |

EXAMPLE 2

Crude phenothiazine of the quality mentioned in Example 1, was treated with 1 per cent by weight of powdered sodium hydroxide and distilled under vacuum. The distilled product was nearly pure, but had a greenish tint and possessed and objectionable odor. It was ground to a powder and washed with approximately twice its weight of a mixture of equal parts by volume of methyl alcohol and carbon tetrachloride. Residual liquid adhering to the product was evaporated. The phenothiazine was thereby obtained as a practically odorless cream colored powder of melting point 185.5°–186.5° C.

Other modes of applying the principle of the invention may be employed instead of those explained, change being made as regards the method herein disclosed provided the step or steps stated by any of the following claims or the equivalent of such stated step or steps be employed.

We therefore particularly point out and distinctly claim as our invention:

1. In a method of purifying phenothiazine to remove impurities incident to its manufacture, the steps which consist in treating the impure phenothiazine with a basic inorganic compound of a metal selected from the class consisting of lithium, sodium, potassium, copper, calcium, strontium, barium, magnesium, zinc, cadmium, and aluminum, at a temperature sufficient to fuse the phenothiazine and distilling the so-treated phenothiazine.

2. In a method of purifying phenothiazine to remove therefrom colored impurities incident to its manufacture, the steps which consist in treating the discolored compound with a minor proportion of a basic inorganic compound of a metal selected from the class consisting of lithium, sodium, potassium, copper, calcium, strontium, barium, magnesium, zinc, cadmium, and aluminum, at a temperature sufficient to fuse the phenothiazine and distilling the so-treated phenothiazine.

3. In a method of purifying phenothiazine to remove therefrom colored impurities incident to its manufacture, the steps which consist in treating the discolored compound with a minor proportion of a basic inorganic compound of an alkali metal, heating the mixture in a closed vessel at a temperature sufficient to fuse the phenothiazine, and distilling the so-treated phenothiazine at subatmospheric pressure.

4. In a method of purifying phenothiazine to remove therefrom colored impurities incident to its manufacture, the steps which consist in heating the discolored phenothiazine together with a minor proportion of an alkali metal hydroxide at a temperature sufficient to melt the phenothiazine, and distilling the so-treated phenothiazine at subatmospheric pressure.

5. In a method of purifying phenothiazine to remove therefrom colored impurities incident to its manufacture, the steps which consist in heating the discolored phenothiazine together with a minor proportion of sodium hydroxide at a temperature sufficient to melt the phenothiazine, and distilling the so-treated phenothiazine at subatmospheric pressure.

6. In a method of purifying phenothiazine to remove therefrom impurities incident to its manufacture, the steps which consist in heating the impure phenothiazine at a temperature sufficient to melt the same in a closed vessel together with a minor proportion of a basic inorganic compound of a metal selected from the class consisting of lithium, sodium, potassium, copper, calcium, strontium, barium, magnesium, zinc, cadmium, and aluminum, distilling the so-treated phenothiazine, and washing the distilled phenothiazine with an organic liquid in which it is substantially insoluble.

7. In a method of purifying phenothiazine to remove therefrom impurities incident to its manufacture, the steps which consist in heating the impure phenothiazine at a temperature sufficient to melt the same in a closed vessel together with a minor proportion of a basic inorganic compound of a metal selected from the class consisting of lithium, sodium, potassium, copper, calcium, strontium, barium, magnesium, zinc, cadmium, and aluminum, distilling the so-treated phenothiazine at subatmospheric pressure, and washing the distilled phenothiazine in pulverized form with an organic liquid selected from the class consisting of alcohols and liquid halogenated aliphatic hydrocarbons.

8. In a method of purifying phenothiazine to remove therefrom impurities incident to its manufacture, the steps which consist in heating the impure phenothiazine at a temperature sufficient to melt the same in a closed vessel together with a minor proportion of a basic inorganic compound of a metal selected from the class consisting of lithium, sodium, potassium, copper, calcium, strontium, barium, magnesium, zinc, cadmium, and aluminum, distilling the so-treated phenothiazine at subatmospheric pressure, and washing the distilled phenothiazine in pulverized form with a liquid halogenated aliphatic hydrocarbon.

9. In a method of purifying phenothiazine to remove therefrom impurities incident to its manufacture, the steps which consist in heating the impure phenothiazine at a temperature sufficient to melt the same in a closed vessel together with a minor proportion of a basic inorganic compound of a metal selected from the class consisting of lithium, sodium, potassium, copper, calcium, strontium, barium, magnesium, zinc, cadmium, and aluminum, distilling the so-treated phenothiazine at subatmospheric pressure, and washing the distilled phenothiazine in pulverized form with an alcohol.

10. In a method of purifying phenothiazine to remove therefrom impurities incident to its manufacture, the steps which consist in heating the impure phenothiazine in a closed vessel together with a minor proportion of a basic inorganic compound of a metal selected from the class consisting of lithium, sodium, potassium, copper, calcium, strontium, barium, magnesium, zinc, cadmium, and aluminum to a temperature sufficient to melt the phenothiazine, distilling the so-treated phenothiazine, and washing the distilled phenothiazine in pulverized form with carbon tetrachloride and a lower aliphatic alcohol.

11. In a method of purifying phenothiazine to remove therefrom impurities incident to its manufacture, the steps which consist in heating the impure phenothiazine in a closed vessel together with a minor proportion of a basic inorganic compound of an alkali metal to a temperature sufficient to melt the phenothiazine, distilling the so-treated phenothiazine, and washing the phenothiazine in pulverized form with an organic liquid selected from the class consisting of alcohols and halogenated aliphatic hydrocarbons.

12. In a method of purifying phenothiazine to remove therefrom impurities incident to its manufacture, the steps which consist in heating the impure phenothiazine in a closed vessel together with a minor proportion of an alkali metal hydroxide to a temperature sufficient to melt the phenothiazine, distilling the so-treated phenothiazine, and washing the phenothiazine in pulverized form with an organic liquid selected from the class consisting of alcohols and halogenated aliphatic hydrocarbons.

13. In a method of purifying phenothiazine to remove therefrom impurities incident to its manufacture, the steps which consist in heating the impure phenothiazine in a closed vessel together with a minor proportion of sodium hydroxide to a temperature sufficient to melt the phenothiazine, distilling the so-treated phenothiazine, and washing the phenothiazine in pulverized form with an organic liquid selected from the class consisting of alcohols and halogenated aliphatic hydrocarbons.

14. In a method of purifying phenothiazine to remove therefrom impurities incident to its manufacture, the steps which consist in heating the impure phenothiazine in a closed vessel together with a minor proportion of sodium hydroxide to a temperature sufficient to melt the phenothiazine, distilling the so-treated phenothiazine, and washing the distilled phenothiazine in pulverized form with carbon tetrachloride and a lower aliphatic alcohol.

EDGAR C. BRITTON.
JOSEPH E. EISENMAN.